W. H. ARBOGAST.
SHADE HANGER.
APPLICATION FILED DEC 27, 1913.
1,119,485.
Patented Dec. 1, 1914.
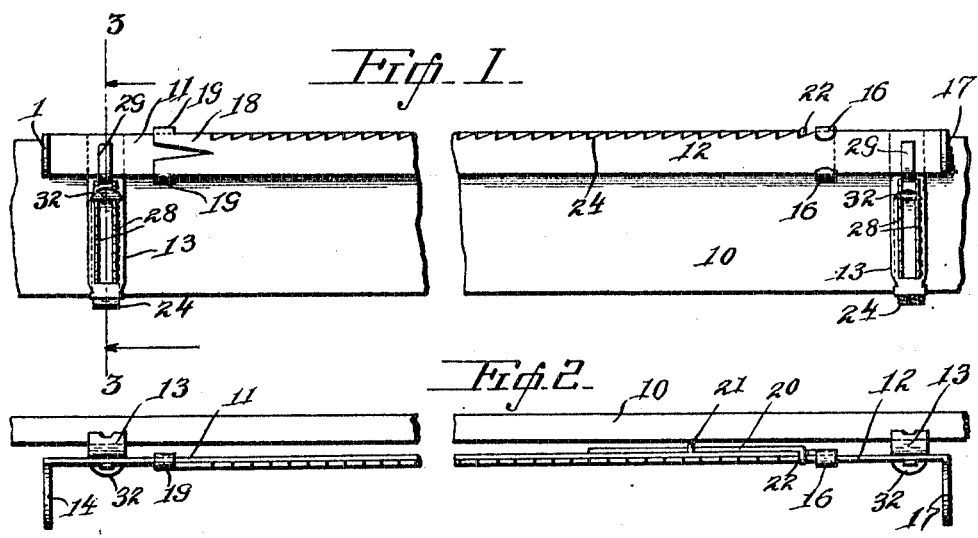
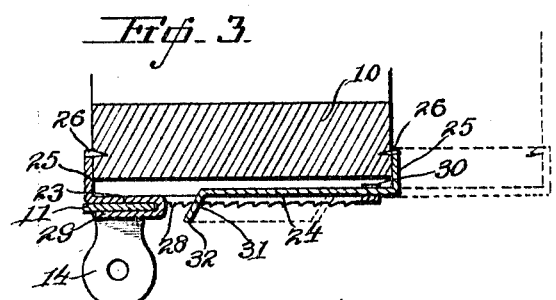
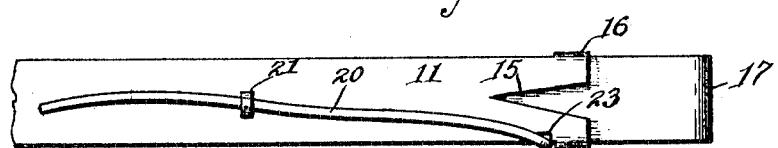
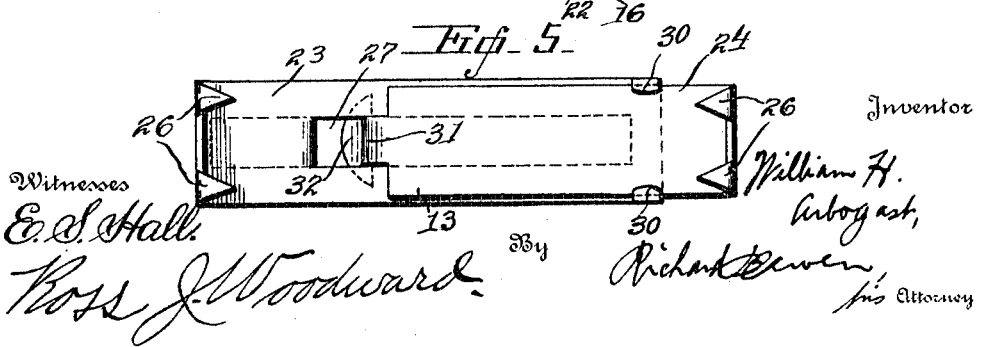
Inventor
William H. Arbogast,
Witnesses

UNITED STATES PATENT OFFICE.

WILLIAM H. ARBOGAST, OF ARBOVALE, WEST VIRGINIA.

SHADE-HANGER.

1,119,485.  Specification of Letters Patent.  Patented Dec. 1, 1914.

Application filed December 27, 1913. Serial No. 809,108.

*To all whom it may concern:*

Be it known that I, WILLIAM H. ARBOGAST, a citizen of the United States, residing at Arbovale, in the county of Pocahontas and State of West Virginia, have invented cretain new and useful Improvements in Shade-Hangers, of which the following is a specification.

This invention relates to an improved shade support, and the principal object of the invention is to provide a bracket which is so constructed that it may be adjusted to fit the width of the cross bar of the window frame and to so construct the bracket that it may be adjusted according to the length of the shade roller.

Another object of the invention is to so construct the bracket that the brackets which are connected with the window frame and the strips which support the curtain pole may be independently adjusted.

Another object of the invention is to so construct the device that the pole-engaging strip may be removed from the supporting brackets.

Another object of the invention is to provide improved means for engaging the strips in an adjusted position and for holding the brackets in an adjusted position.

This invention is illustrated in the accompanying drawings wherein—

Figure 1 is a plan view looking at the upper portion of a window frame upon which the improved shade support is mounted; Fig. 2 is an elevation showing the supporting plate; Fig. 3 is a sectional view taken along the line 3—3 of Fig. 1; Fig. 4 is a fragmentary view showing the manner of mounting the spring strip which holds the roller-engaging strips in an adjusted position; Fig. 5 is a plan view of one of the attaching brackets.

This support is removably secured to the cross strip 10 of the window frame and comprises the adjustably-connected roller supporting strips 11 and 12 which are removably connected with the window-engaging brackets 13. The strip 11 is formed of resilient sheet metal and has its outer end portion bent to form the tongue 14 and its inner end portion bifurcated as shown at 15 and provided with arms 16 which are bent about the strip 12 to slidably connect the strip 11 with the strip 12. The outer end of the strip 12 is also bent to form a tongue 17 similar to the tongue 14 and has its inner end portion bifurcated as shown at 18 and provided with side arms 19 which are bent about the strip 11 in the same manner that the arms 16 are bent about the strip 12. It will thus be seen that the two strips will be slidably connected together, but prevented from becoming entirely disengaged when bent their full extent.

A locking member 20 which is preferably formed of resilient wire is secured to the strip 11 by means of the eye 21 and has its free end portion bent to form a finger 22 which extends through a notch 23 formed in the strip 11 to engage the teeth of the rack 24 formed in one edge of the strip 12. This locking member 20 will securely hold the strips in an adjusted position, but will permit the strips to be moved longitudinally if desired so that in case it is desired to use the support with a curtain of a different length from that already in use, the strips may be adjusted to fit the length of the roller.

Each of the attaching brackets 13 is formed in the same manner and therefore a description of one of the brackets will suffice for both. Each of these brackets is formed of two sections 23 and 24 which are adjustably connected together and have their outer end portions bent to form the arms 25 carrying teeth 26. The strip 23 is provided with a longitudinally-extending slot 27 and is provided along the longitudinal edges of the slot 27 with teeth 28 forming racks. This slot 27 is formed by cutting out of the strip 23 a tongue 29, which tongue is bent to engage the outer end portion of one of the strips 11 and 12 and thus removably connect the pole-engaging strip with the supporting bracket. The strip 24 is slidably connected with the strip 23 by means of the arms 30 and is provided at its inner end with a reduced neck 31 which extends through the slot and has its outer end formed in the enlarged head 32, the side portions of which engage the racks 28.

When using this device, the brackets 13 are first opened a sufficient amount to permit the strip 10 to pass between the teeth 26 and the sections of the brackets and are then driven together so that the teeth will be driven into the strip 10 and thus securely connecting the brackets with the window frame. When the brackets are in the position shown in Fig. 3, the sections of the bracket will be prevented from slipping apart by the head 32 which engages the racks 28. After the brackets are in place, the pole-engaging strips are connected with the brackets by slipping the strips 11 and 12 behind the tongues 29. These strips 11 and 12 may be connected with a curtain pole before being connected with the brackets, or if desired, may be first connected with the brackets and the curtain pole then placed between the tongues 14 and 17 and the strips 11 and 12 move to engage the pivot pins of the pole.

If it is desired to remove the curtain from the supporting device and put up a wider and narrower curtain, the strips 11 and 12 can be removed from the brackets and connected with these new curtains; or if desired, the old curtain can be removed and the new curtain put in place without it being necessary to disengage the strips 11 and 12 from the bracket. It is, of course, obvious that when removing the old curtain, it is necessary to raise the finger 22 out of engagement with the rack 24 so that the strips 11 and 12 may be drawn apart. When it is desired to remove the brackets from the window frame, the head 32 is grasped by the fingers and drawn outwardly so that the head does not engage the teeth 28 and the sections 23 and 24 can then be drawn apart. A support has therefore been provided in which the brackets may be removably connected with the window frame, the brackets being so constructed that they may be easily adjusted to fit the frame. It should also be noted that these brackets are so constructed that while they will be securely held in engagement with the frame, they may be very easily and quickly disconnected from the frame. It should also be noted that a support has been provided in which the pole-engaging strips may be easily and quickly adjusted with the curtain pole and which may be securely held and at the same time releasably connected with the supporting bracket.

What is claimed is:

1. A supporting bracket of the character described comprising a pair of slidably connected sections, one of said sections being provided with a longitudinally extending slot, a rack carried by said section, a neck extending from the inner end of the other of said sections through said slot, and an enlarged head carried by said neck and engaging said rack for holding said sections in an adjusted position.

2. In a device of the character described a pair of resilient strips, means for slidably connecting said strips, a rack carried by one of said strips, and a resilient rod secured to the other of said strips and having its free-end portion bent to form a finger extending through a notch formed in the strip and engaging the rack of said first-mentioned strip.

3. In a device of the character described a pair of pole-engaging strips, supporting brackets for said strips, each of said brackets comprising a pair of sections formed of resilient material, one of said sections being provided with a longitudinally-extending slot and being also provided with teeth forming racks, the inner end of the other of said strips being reduced to form a neck extending through said slot and having its outer end formed into an enlarged head engaging the teeth of said racks, a tongue extending from one end of said slot and engaging one of said pole-engaging strips, and means for connecting said sections with a window frame.

4. A device of the character described including a supporting bracket, said supporting bracket comprising a pair of sections formed of resilient sheet material, one of said sections being provided with a longitudinally-extending slot, racks carried by said section adjacent said slot, a tongue extending from said section and forming engaging means, arms carried by said section and engaging the other of said sections to slidably connect said sections, a neck extending from the inner end of said second section through said slot, and an enlarged head at the outer end of said neck engaging said racks for holding said sections in an adjusted position.

5. A bracket of the character described comprising a pair of slidably connected sections, one of said sections being provided with a longitudinally extending slot and the other of said sections being provided with a neck extending through said slot and terminating in a head for engaging said first mentioned section upon opposite sides of the slot formed therein to releasably hold said sections in an adjusted position.

In testimony whereof I affix my signature in presence of two witnesses.

WILLIAM H. ARBOGAST.

Witnesses:
H. C. BURNER,
A. I. LOCKRIDGE.